J. S. & E. B. LAKE.
Weighing Scale.

No. 55,503.  Patented June 12, 1866.

WITNESSES:

INVENTOR.

UNITED STATES PATENT OFFICE.

JESSE S. LAKE, OF SMITH'S LANDING, AND EZRA B. LAKE, OF BRIDGEPORT, NEW JERSEY.

IMPROVEMENT IN WEIGHING-SCALES.

Specification forming part of Letters Patent No. 55,503, dated June 12, 1866.

*To all whom it may concern:*

Be it known that we, JESSE S. LAKE, of Smith's Landing, in the county of Atlantic and State of New Jersey, and EZRA B. LAKE, of Bridgeport, in the county of Gloucester and State of New Jersey, have invented a new and useful Improvement in Weighing-Scales; and we do hereby declare that the following is a full, clear, and exact description thereof, which will enable others skilled in the art to make and use the same, reference being had to the accompanying drawings, forming part of this specification, in which—

Figure 1:
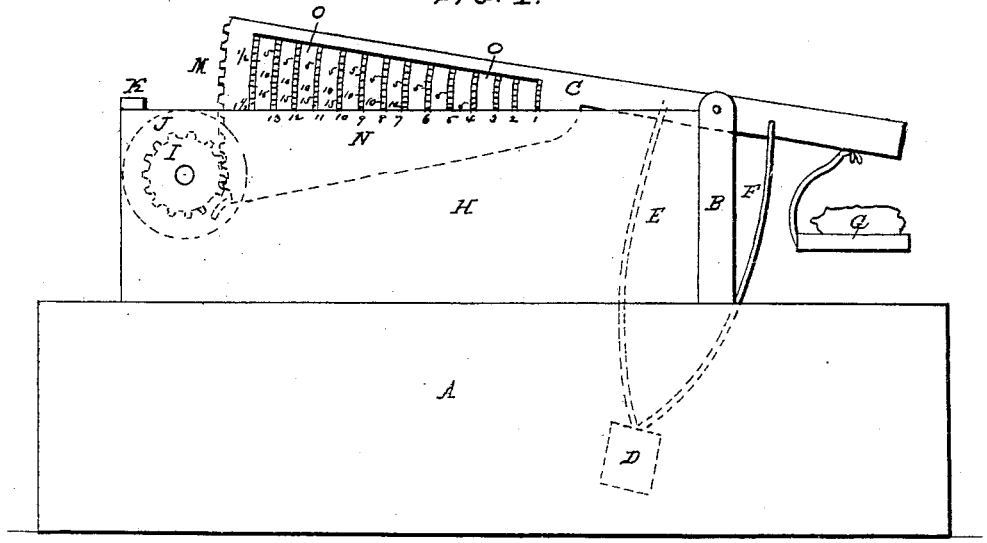
Figure 2:
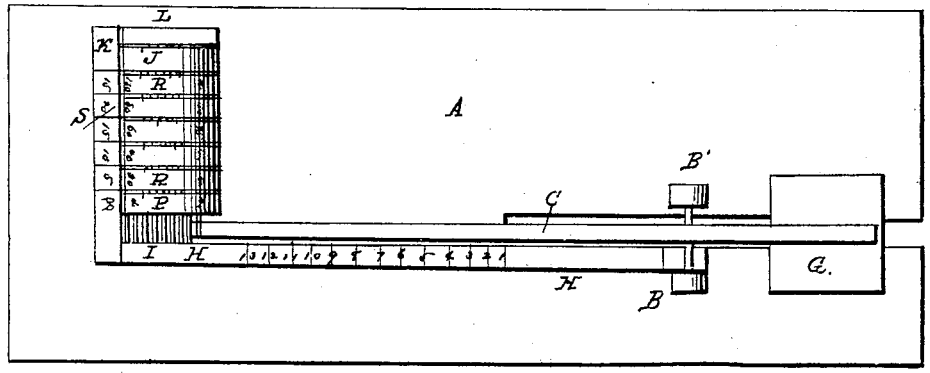

Figure 1 is a side view of a weighing-scale illustrating our invention. Fig. 2 is a plan or top view of the same.

Similar letters of reference indicate like parts.

The object of our invention is to furnish a weighing-scale which shall indicate both the weight of the article and its value at any given rate per pound; and it consists in combining with the beam or lever of a weighing-scale a calculated table so graduated and arranged as to show the value of the amount weighed at a given price per pound.

A is the box or platform upon which the scale is set. B B' are standards, to which the lever or scale-beam C is pivoted. D is the balance-weight of the scale, which is supported by the rods E F, attached to the lever or scale-beam C, one on each side of the pivoting-point of said beam. G is the scale-pan, upon which are placed the articles to be weighed, and which is pivoted to the forward end of the scale-beam C. H is a partition or beam, the upper edge of which serves as a pointer or index to mark the weight of the article weighed upon the scale M, formed upon the side of the beam C. Thus, as the beam H stands in Fig. 1, the article upon the scale-pan weighs one and a half pounds. The numbers on scale N, on the upper edge of the beam or partition H, indicate the price per pound at which various articles may be sold. Upon the side of the beam C, opposite the numbers of the scale N, are formed scales O, in each of which the space or area through which the beam C moves in passing from the zero-point to the point 1 of the scale M is divided up into as many subdivisions as here are units in the number opposite which the said scale is formed. Thus in the scale O, opposite the number 12 of the scale N, the space through which that part of the beam C passes in weighing a pound is divided into twelve subdivisions, as shown. In weighing a pound and a half the upper end of the beam H would stand at the eighteenth division-mark, which would show the price of a pound and a half at twelve cents or twelve dollars per pound, the scales O thus becoming tables to show the price of the quantity weighed at a given rate per pound.

For convenience in reading, the scale M of weights is numbered every half-pound and the scales O of prices at every fifth division-mark.

The end of scale beam or lever C is toothed, as shown in Fig. 1. These teeth work into the teeth of the gear-wheel I and cause it to revolve with the change of position of the beam C. Attached to the gear-wheel I, and revolving with it, is a cylinder, J, upon the surface of which are arranged various scales. The one, P, nearest the right-hand end of the cylinder, shows the weight of the article, and in the drawings is divided up into division-marks of one-quarter of a pound each. The others, R, on the cylinder, indicate the amount for which the quantity weighed should be sold at a given rate per pound. The scale upon the beam K is the scale S of prices per pound.

It should be observed that the scales M N O are to be used when the weight of the article and the price are both small; but when heavier articles are to be weighed the balance-weight D may be replaced by a larger one in the ordinary manner, or an additional weight may be added to the weight D. In this case the scales P R S must be used.

The gear-wheel I and cylinder J revolve in bearings, one in the partition H and the other in the standard L, erected on the platform or box A at the farther end of the cylinder J.

The number of the scales upon the scale-beam C and the cylinder J, and the extent to which their subdivision is carried, will depend upon the size of the scales and the use to which they are to be applied.

We claim as new and desire to secure by Letters Patent—

1. The combination, with the beam or lever C and beam or partition H of a weighing-scales, of the scales M N O, constructed and arranged substantially as described and for the purpose set forth.

2. The combination of the cylinder J and cog-wheel I with the toothed end of the beam or lever C, substantially as described and for the purpose set forth.

3. The combination, with the cylinder J and beam K of the weighing-scales, of the tables P R S, constructed and arranged substantially as described and for the purpose set forth.

JESSE S. LAKE.
EZRA B. LAKE.

Witnesses:
WILSON KERR,
ALFRED FISLER.